United States Patent [19]

Lake et al.

[11] Patent Number: 5,001,092

[45] Date of Patent: Mar. 19, 1991

[54] SODIUM SULFATE CONTAINING REFRACTORY COMPOSITION

[75] Inventors: Lawrence J. Lake, Edgerton, Ohio; Charles R. Rumpeltin, Plainsboro; William R. Herberger, Freehold, both of N.J.

[73] Assignee: Quigley Company Inc., New York, N.Y.

[21] Appl. No.: 279,478

[22] Filed: Dec. 2, 1988

[51] Int. Cl.$^5$ .............................................. C04B 35/04
[52] U.S. Cl. .................................. 501/108; 501/109; 501/110; 501/117
[58] Field of Search ................ 501/108, 109, 110, 117

[56] References Cited

U.S. PATENT DOCUMENTS

| | | | |
|---|---|---|---|
| 2,537,013 | 1/1951 | Austin et al. | 501/114 |
| 2,702,751 | 2/1955 | Austin et al. | 501/116 |
| 3,030,216 | 4/1962 | Chantler et al. | 501/109 |
| 3,262,793 | 7/1966 | Neely | 501/111 |
| 3,304,187 | 2/1967 | Lippes | 501/111 |
| 3,333,972 | 8/1967 | Elmer et al. | 501/109 |
| 3,357,842 | 12/1967 | Bowman | 501/108 |
| 3,357,843 | 12/1967 | Bowman | 501/111 |
| 3,540,897 | 11/1970 | Martinet | 501/111 |
| 4,152,167 | 5/1979 | Horwitz | 501/111 |
| 4,237,025 | 12/1980 | Tidrex | 252/192 |
| 4,276,091 | 6/1981 | Cassens, Jr. | 501/118 |
| 4,463,100 | 7/1984 | Cassens | 501/100 |

Primary Examiner—William R. Dixon, Jr.
Assistant Examiner—Anthony J. Green
Attorney, Agent, or Firm—Peter C. Richardson; Lawrence C. Akers; Robert F. Sheyka

[57] ABSTRACT

A refractory composition is disclosed which consists essentially of sized refractory aggregate including at least 10%, based on the total weight of the composition, MgO containing grain having at least 50% MgO and passing a 5 mesh screen, from about 0.1 to about 1.5%, on the dehydrated basis, of chrome sulfate or sodium sulfate, from about 0.1 to about 1.5% of an organic acid or salt thereof; and up to about 1.1% of a plasticizer.

5 Claims, No Drawings

SODIUM SULFATE CONTAINING REFRACTORY COMPOSITION

BACKGROUND OF THE INVENTION

The invention pertains to refractory compositions. More particularly, the present invention relates to a refractory composition suitable for gunning, ramming or casting a monolithic structure.

When refractory mixes, particularly those for gunning, were first developed, the practice was to use conventional refractory bonds, such as sodium silicate or magnesium sulfate, as the bonding agent. While useful for their intended purpose, these mixes did not always exhibit maximum performance characteristics. For instance, if these mixes containing conventional bonding systems are used for gunning, there may arise some shortcomings since gunning mixes must mix readily with water, adhere well to a furnace wall without slumping or rebounding and must set to a coherent mass very rapidly. If these mixes containing conventional bonding systems are used for casting or ramming, they also may function well but increased performance is always desirable.

Accordingly, special bonding system have been developed.

U.S. Pat. No. 3,879,208 discloses a bonding system using aluminum sulfate.

U.S. Pat. No. 3,357,842 discloses a refractory composition containing monosodium dihydrogen orthophosphate as the bonding agent.

U.S. Pat. No. 3,357,843 discloses a bonding system using glassy polyphosphates, particularly sodium tripolyphosphate as the bonding agent.

U.S. Pat. No. 2,702,751 discloses a refractory composition containing magnesia, a chromium compound, for instance, chrome sulphate, and a boron compound.

U.S. Pat. No. 1,916,971 discloses a high temperature cement of aggregate, magnesium sulfate, and sodium citrate or citric acid.

U.S. Pat. No. 3,030,217 discloses a ramming mix of dead burned magnesite and an alkali metal salt of a monohydroxy aromatic monocarboxylic acid.

U.S. Pat. No. 3,333,972 discloses a refractory cementitious material of finely divided monoplastic magnesia and an organic acid, such as citric acid, or salt thereof.

U.S. Pat. No. 833,930 discloses a cement of magnesia, magnesium sulfate and a soluble salt of lead free from chlorine.

U.S. Pat. No. 3,360,388 discloses the use of boron compounds bonded with sodium silicate as the bonding agent in a refractory composition.

U.S. Pat. No. 2,619,426 discloses a refractory composition suitable for ramming, casting or pressing, or for use as mortar, and bonded with a combination of aluminum sulfate and calcium phosphate.

U.S. Pat. No. 4,276,901 discloses a refractory composition containing from 0.5 to 5% bentonite; from 1.5 to 10% of a bonding system consisting of from 1 to 5% alkali metal phosphates and from 0.5 to 5% aluminum sulfate; and up to 10% pitch.

SUMMARY OF THE INVENTION

The present invention is directed to a refractory composition consisting essentially of sized refractory aggregate including at least 10%, based on the total weight of the composition, MgO containing grain having at least 50% MgO and passing a 5 mesh screen; from about 0.1 to about 1.5%, on the dehydrated basis, of chrome sulfate or sodium sulfate, from about 0.1 to about 1.5% of an organic acid or salt thereof; and up to about 1.1% of a plasticizer.

A preferred composition is one wherein the MgO-containing grain contains at least 85% MgO.

Also preferred is the composition wherein the refractory aggregate is all grain containing at least 85% MgO.

A preferred organic acid is citric acid or a salt thereof, preferably a citrate.

Also preferred is the composition wherein the plasticizer is bentonite.

An especially preferred composition is one wherein the plasticizer is bentonite and the organic acid or salt thereof is citric acid or a citrate.

DETAILED DESCRIPTION OF THE INVENTION

The refractory aggregate used in the present invention can be any such material that contains the specified amounts of MgO containing grain, but preferably will be a non-acid aggregate such as periclase or periclase and chrome ore. In a particularly preferred embodiment of the invention, the refractory aggregate is all periclase containing at least 85%, and preferably about 90% or more MgO. The aggregate is sized according to principles well known in the industry to achieve maximum density ranging in size from, for example, material just passing a 5 mesh screen down to material passing a 325 mesh screen.

The refractory aggregate can also be deadburned magnesite. Both periclase and deadburned magnesite are commercially available or may be obtained by processes well known in the art to which this invention pertains.

The chrome sulfates used in the present invention are well known items of commerce and can be either the chrome (II) sulfate (Cr $SO_4$) or the chrome (III) sulfate ($Cr_2 (SO_4)_3$) As is well known, chrome sulfate exists with various waters of hydration. For example, the "Handbook of Chemistry and Physics", 51st edition, lists on page B-84, the anhydrous material of the chrome (III) sulfate, and also lists two hydrated materials, one containing 15 waters of hydration and the other containing 18 waters of hydration. The Handbook also lists the chrome (II) sulfate as containing 7 waters of hydration. It is also well known that the number of waters of hydration of a mineral compound, such as chrome sulfate, can vary depending on the temperature and humidity. Thus, it will be understood by those skilled in the art that the term "chrome sulfate" appearing in the specification and claims also encompasses those compounds having varying degrees of hydration.

The sodium sulfates used in the present invention are also well known items of commerce. In the "Handbook of Chemistry and Physics", page B-140, various forms of sodium sulfate are listed. These forms are the anhydrous form ($Na_2SO_4$, natural thermadite); the decahydrate ($Na_2SO_4 .10 H_2O$, Glauber's salt, mirabilite); and the heptahydrate ($Na_2SO_4 .7 H_2O$). As previously discussed in connection with chrome sulfate, the number of waters of hydration of sodium sulfate can also vary depending on the temperature or humidity. Thus, it will be appreciated by those skilled in the art that the term "sodium sulfate" appearing in the specification and claims also encompasses those compounds having varying degrees of hydration.

Both the chrome sulfate and the sodium sulfate are used in the form of a powder, for example substantially all passing a 20 mesh screen. The hydrated forms can also be used.

The organic acid used may be a mono, dir, or tri carboxylic acid such as citric acid, succinic acid, glutaric acid, maleic acid, and the like. Other organic acids include the sulfonic acids, especially the arylsulfonic acids. The corresponding salts, for example, the sodium or potassium salts of these acids, can also be used. A preferred class of materials are the citrates, sodium citrate being preferred. These materials are well known items of commerce and are used in granular form, for example, in the form of material substantially all passing a 16 mesh screen.

It will frequently be found advantageous to incorporate inc compositions according to this invention, particularly when they are to be applied by the gunning technique, a small amount of a plasticizer, for example, up to about 1.1% by weight of a plastic montmorillonite clay, such as bentonite. Other organic plasticizers can also be used, such as cellulose derivatives.

The various ingredients will be admixed by the refractories manufacturer and shipped to the customer, for example in bags containing 25 or 50 kg (50 or 100) pound sacks) or even larger containers. The user, if the mix is to be used for gunning, will place the composition in a refractory gun or similar apparatus and use it to repair or maintain a furnace lining by gunning it onto the surface of the lining, either while the furnace is still hot, or after it has cooled down, as is well known in this art.

If the compositions of the present invention are used as ramming mix compositions, the components can be mixed together and water added for immediate use or the dry mixture can be stored or shipped. If a dry ramming mix is used, it can be thoroughly mixed with 3-6 lbs of water per 100 lbs of dry ramming mix composition to form a wetted mixture, and then the material may be formed by ramming in any manner known in the art.

When the compositions of the present invention are used in casting processes, the refractory concrete will contain from 10% to about 60%, preferably 30%, of the composition of the present invention. The amount of water employed in forming or in casting the mix is that which is sufficient to temper or to impart plasticity thereto, according to practices well known in the art to which this invention pertains. In general, in making cast concretes using a coarse aggregate, there is employed from 4% to 15% water; in making castings employing finer grained aggregate, for instance in slip casting, much higher amounts of water, e.g. 35% to 40% or more, are employed; and in making pressed shapes, such as brick, there is employed from 1% to 7% or more of water. The percent of water is calculated based on the dry solids.

Having described the invention in general terms, reference is now made to specific examples. It is to be understood that these examples are not to be construed as limiting the invention, the scope of which is determined by the appended claims.

EXAMPLE 1

Four compositions were made, one (A) with 1.0% sodium sulfate, (B) with 0.5% basic chrome sulfate, (C) with 1% basic chrome sulfate, and (D) with 1.0% sodium sulfate again. All four mixtures contained 1.0% citric acid, with mixture (A) also containing 1.0% of a plasticizer. Mixture (B) contained 1.1% of a plasticizer, mixture (C) also contained 1.0% of the plasticizer, while mixture (D) contained no plasticizer. The balance of the mixture being sized magnesia refractory aggregate passing a 5 mesh screen and about 19% passing a 325 mesh screen. Composition (D) contained about 23% passing a 325 mesh screen.

The four different batches were cast into molds to form bars 9×2×2 inches. The cast specimens were allowed to air cure for 24 hours, then were dried at 230° F. for an additional 24 hours. The compositions were then tested for the characteristics listed in the tables below. All physical properties are averages.

TABLE 1

|  | A | B | C | D |
| --- | --- | --- | --- | --- |
| Sodium Sulfate | 1.0 |  |  | 1.0 |
| Citric Acid | 1.0 | 1.0 | 1.0 | 1.0 |
| Chrome Sulfate |  | 0.5 | 1.0 |  |
| Plasticizer | 1.0 | 1.1 | 1.0 |  |
| % Water | 8.0 | 8.5 | 9.0 | 7.0 |

TABLE 2

|  | A | B | C | D |
| --- | --- | --- | --- | --- |
| Bulk Density PCF |  |  |  |  |
| After 230° drying | 166.3 | 164.5 | 164.6 | 168.5 |
| After 500° Firing | 165.4 | 163.7 | 160.0 | 171.4 |
| After 2000° Firing | 162.5 | 163.6 | 156.2 | 164.4 |
| After 2500° Firing | 163.7 | 161.8 | 157.8 | 167.4 |
| After 3000° Firing | 170.1 | 167.6 | 161.4 | 169.5 |
| Cold Modulus of Rupture PSI |  |  |  |  |
| After 230° drying | 446 | 371 | 294 | 464 |
| After 500° Firing | 398 | 396 | 323 | 588 |
| After 2000° Firing | 394 | 298 | 157 | 285 |
| After 2500° Firing | 923 | 924 | 304 | 1204 |
| After 3000° Firing | 1511 | 2395 | 1035 | 1330 |
| Cold Crushing Strength PSI |  |  |  |  |
| After 230° drying | 3335 | 3635 | 5131 | 3607 |
| After 500° Firing | 3882 | 3753 | 3512 | 4113 |
| After 2000° Firing | 1593 | 1396 | 1170 | 1247 |
| After 2500° Firing | 3138 | 3024 | 1944 | 4166 |
| After 3000° Firing | 4253 | 5025 | 3377 | 4882 |

The sized magnesia refractory grain used was periclase having the following chemical analysis:

| | |
| --- | --- |
| $MgO$ | 91.6 |
| $CaO$ | 2.3 |
| $SiO_2$ | 2.8 |
| $Al_2O_3$ | 0.8 |
| $Fe_2O_3$ | 2.3 |
| $B_2O_3$ | 0.2 |

We claim:

1. A refractory composition consisting essentially of: from about 0.1 to about 1.5%, on the dehydrated basis, of sodium sulfate; from about 0.1 to about 1.5% of an organic acid or salt thereof; up to about 1.1% of a plasticizer; with the balance being sized magnesia based refractory aggregate; wherein at least 50% of said refractory aggregate is MgO—containing grain having at least 50% available MgO passing a 5 mesh screen, all percentages by weight being based on the weight of the total composition.

2. A composition according to claim 1, wherein the MgO containing grain consisting essentially of at least 85% MgO.

3. A composition according to claim 1, wherein the organic acid or salt thereof is citric acid or a citrate.

4. A composition according to claim 1, wherein the plasticizer is bentonite.

5. A composition according to claim 4, wherein the organic acid or salt thereof is citric acid or a citrate.

* * * * *